Figure 10:
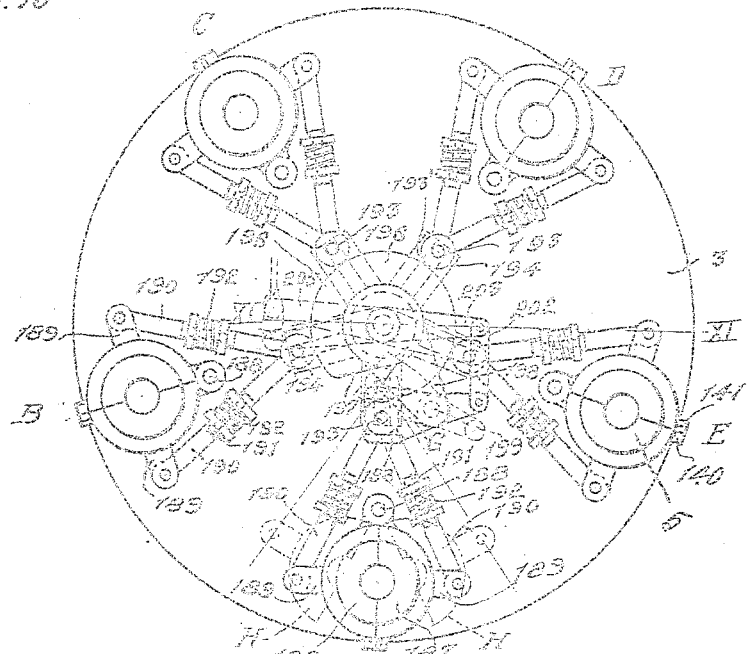

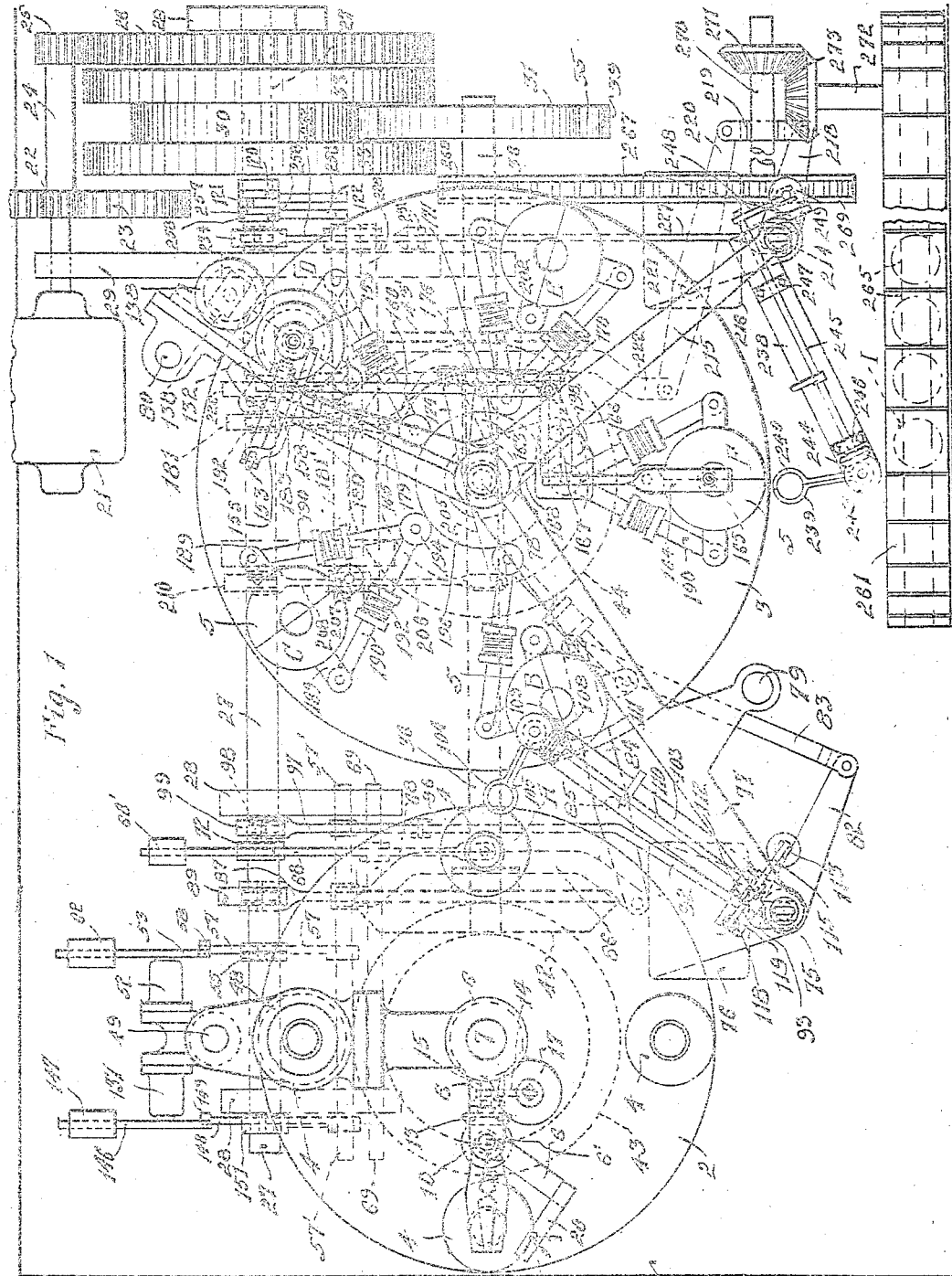

R. O. STILWELL.
BOTTLE MAKING MACHINE.
APPLICATION FILED AUG. 4, 1914.
1,282,487.
Patented Oct. 22, 1918.
8 SHEETS—SHEET 2.
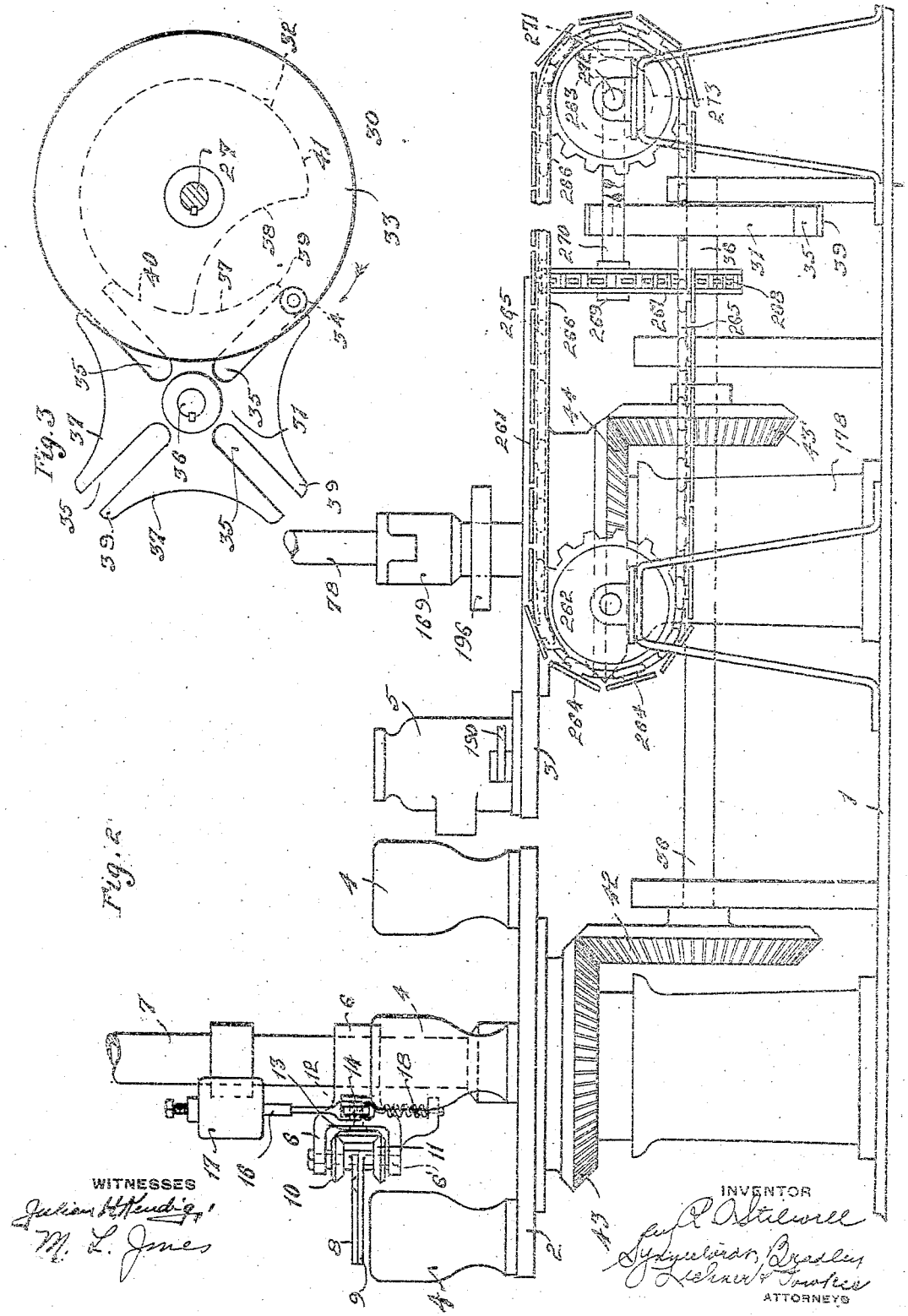

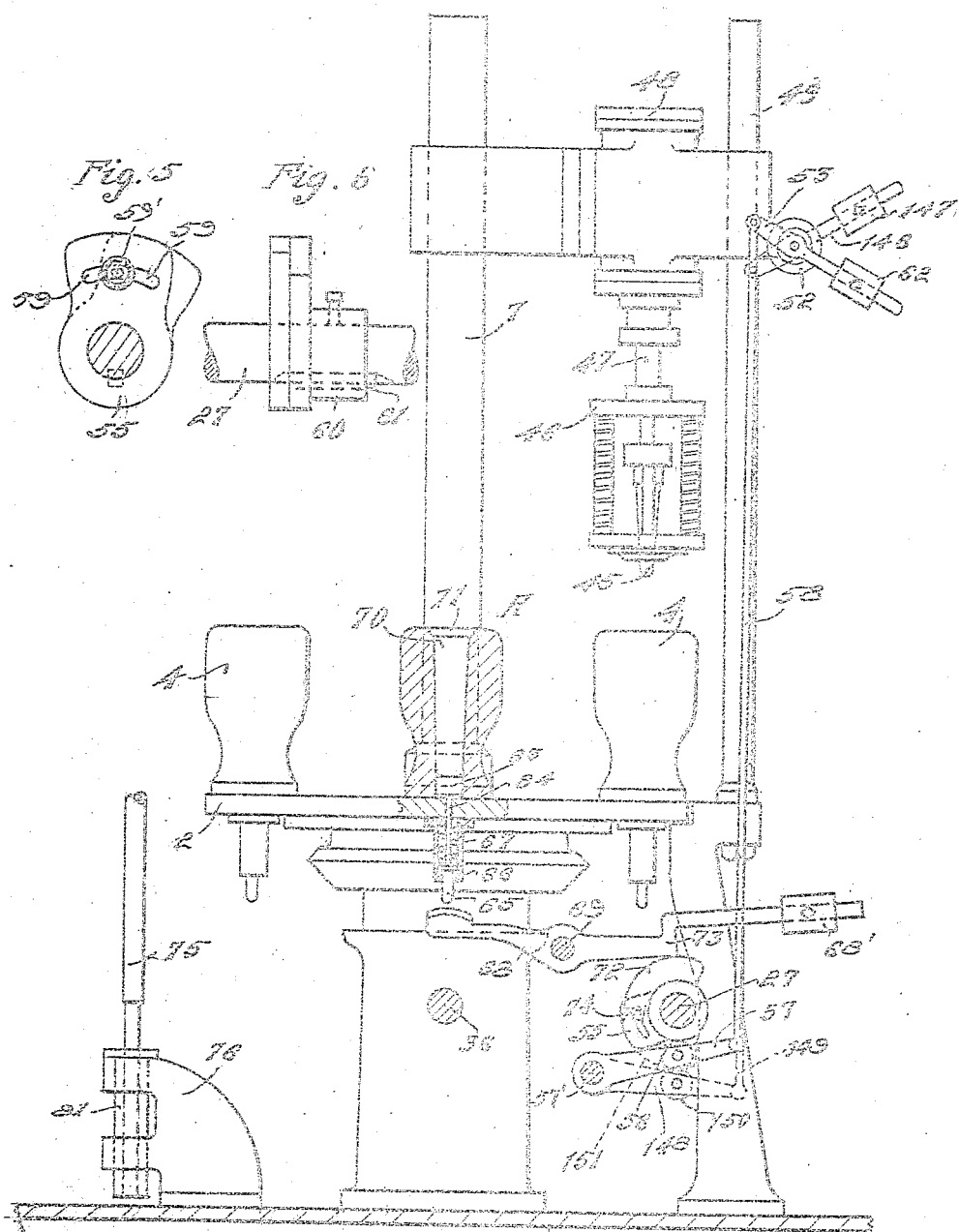

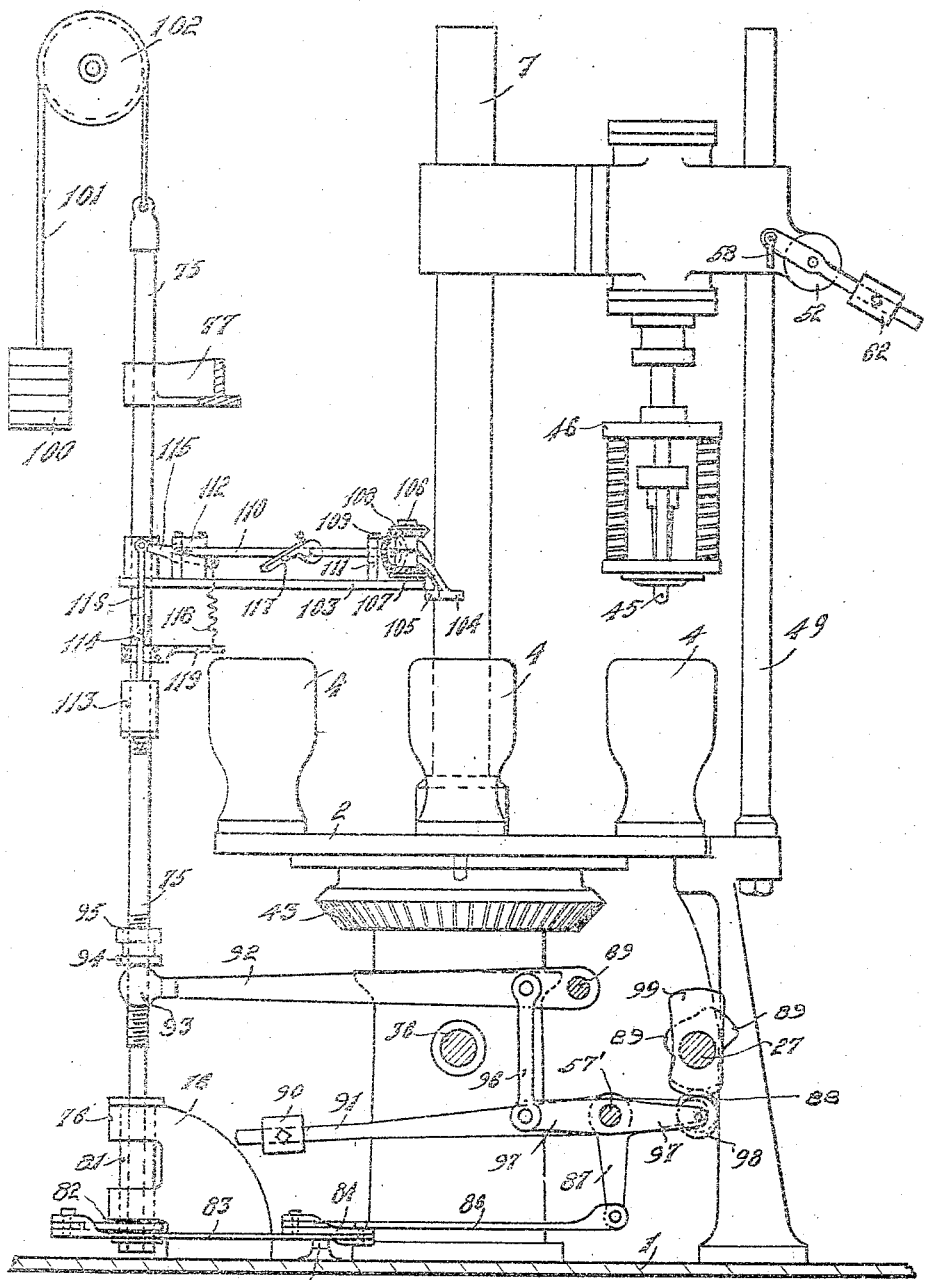

R. O. STILWELL.
BOTTLE MAKING MACHINE.
APPLICATION FILED AUG. 4, 1914.
1,282,487.
Patented Oct. 22, 1918.
8 SHEETS—SHEET 5.
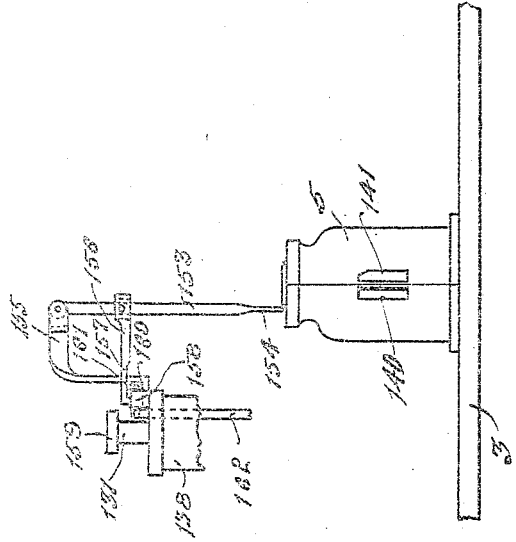
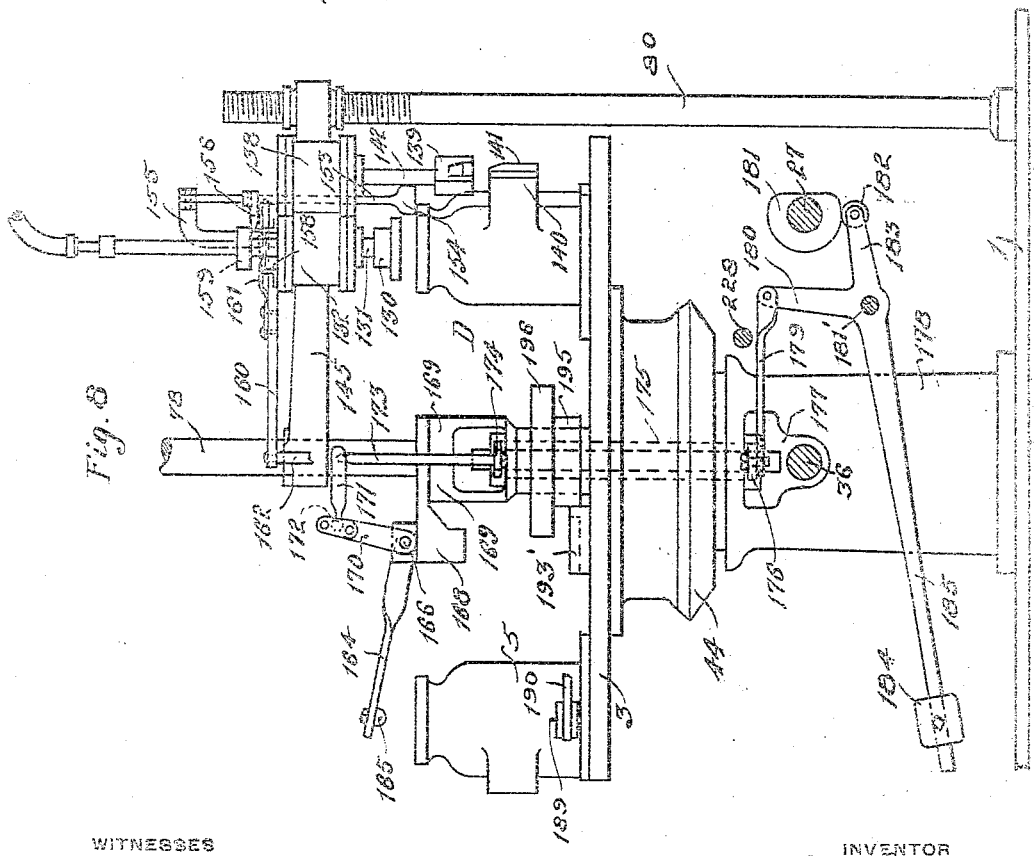

R. O. STILWELL.
BOTTLE MAKING MACHINE.
APPLICATION FILED AUG. 4, 1914.

1,282,487.

Patented Oct. 22, 1918.
8 SHEETS—SHEET 6.

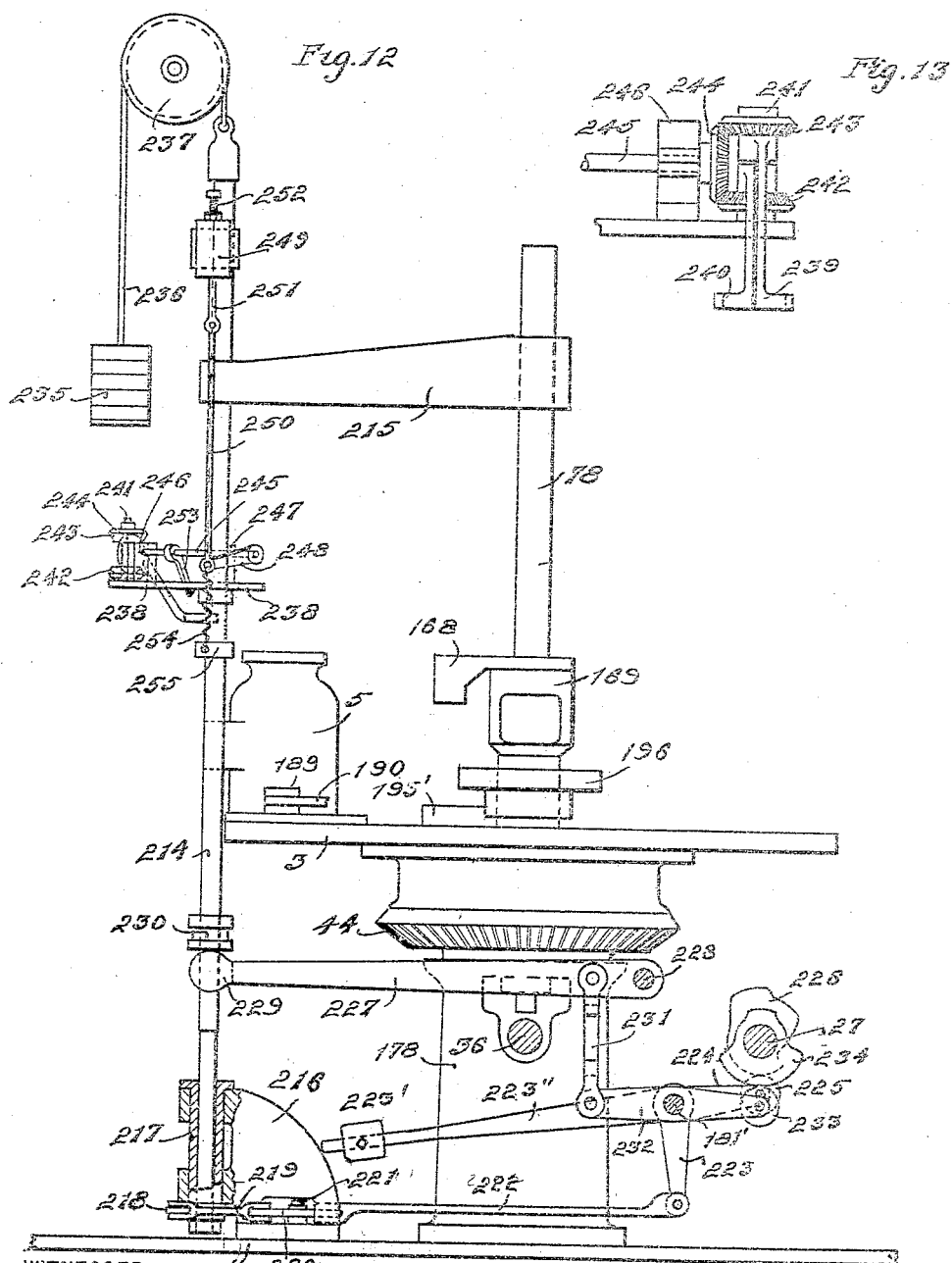

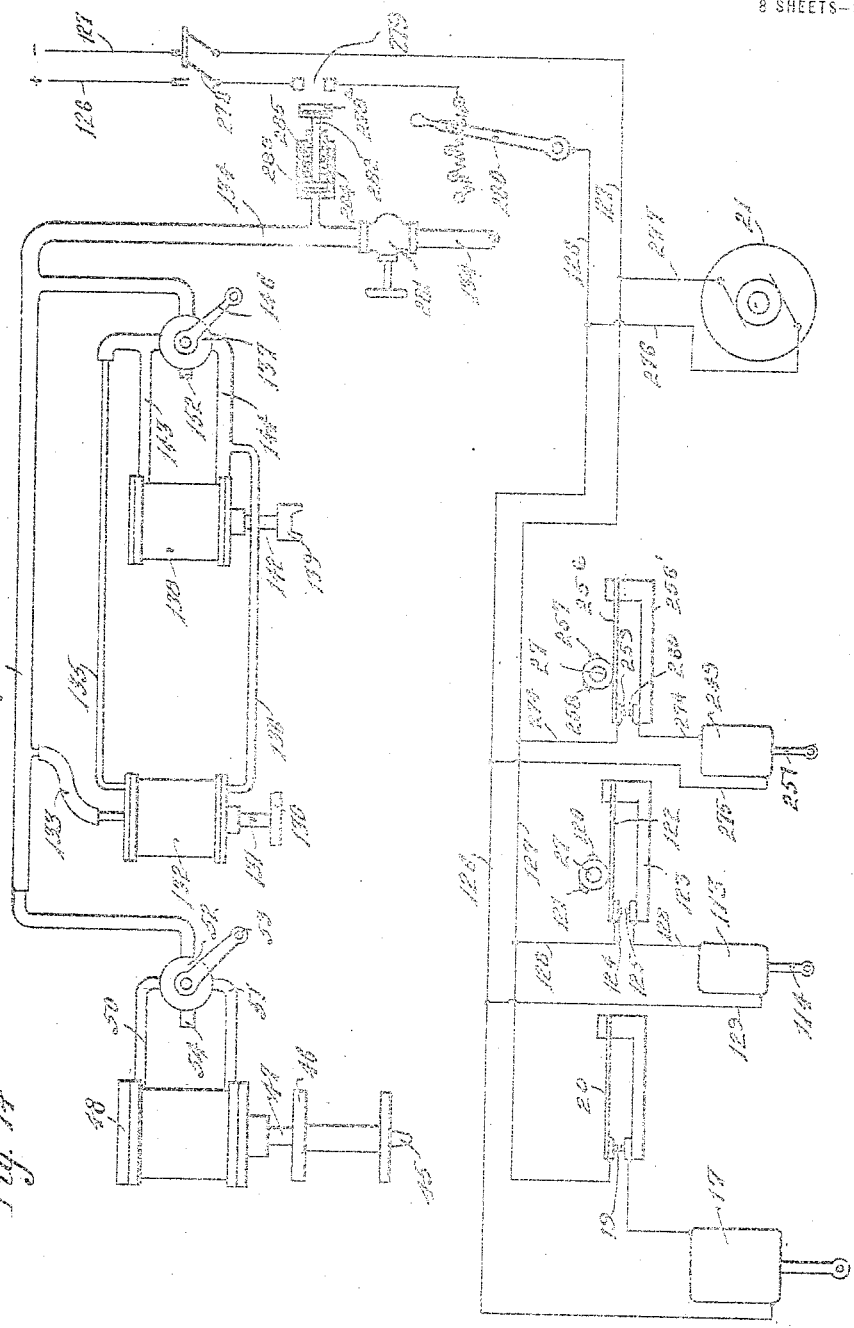

UNITED STATES PATENT OFFICE.

RICHARD O. STILWELL, OF TARENTUM, PENNSYLVANIA, ASSIGNOR, BY MESNE ASSIGNMENTS, TO ATLANTIC BOTTLE COMPANY, OF NEW YORK, N. Y., A CORPORATION OF NEW YORK.

BOTTLE-MAKING MACHINE.

1,282,487.

Specification of Letters Patent.

Patented Oct. 22, 1918.

Application filed August 4, 1914. Serial No. 854,903.

*To all whom it may concern:*

Be it known that I, RICHARD O. STILWELL, a citizen of the United States, residing at Tarentum, in the county of Allegheny and State of Pennsylvania, have invented certain new and useful Improvements in Bottle-Making Machines, of which the following is a specification.

This invention relates to bottle making machines, and particularly to that class of bottle making machines wherein a blank is formed in one part of the machine from a portion of glass provided therefor, and subsequently blown into a finished bottle, or other glass article, by another part of the machine. The construction has for its principal objects the provision of positive operating means for operating the various moving elements of the mechanism; the provision of a positive driving mechanism for the tables carrying the blank molds and bottle molds wherein the tables are locked in operative positions by the driving mechanism; the provision of an improved shearing mechanism for segregating the glass supplied to the machine; the provision of a positive means for controlling the actuation of the blank forming plunger; the provision of a simple ejector for the blank; the provision of a means for automatically transferring a blank from the blank mold to the mold in which the blank is to be blown to form a bottle; the provision of a selector whereby the blow head on the bottle blowing part of the machine is prevented from engaging an "over pressed" blank; the provision of means for automatically locking the mold securely before a bottle is blown; the provision of an improved means for controlling the operation of the blow head; the provision of a means for positioning a bottle in the bottle mold so that it is not displaced when the mold is opened; the provision of means for automatically opening and closing the molds at proper intervals; the provision of a bottle transfer adapted to transfer a finished bottle from the mold to a conveyer; the provision of a suitable conveyer to receive the bottles from the machine from which they are subsequently carried to the leer; the provision of a safety controlling switch wherein the machine is protected against premature starting of certain elements; and in general the provision of a machine of the character described, which effects a saving in time and labor with an increase of capacity.

The invention further contemplates an arrangement of the driven elements with respect to the driving or actuating elements wherein their periods of operation are determined from a single actuating element and may be adjusted therewith, and when once adjusted every element will be actuated at predetermined intervals without variation.

These together with such other objects as may hereinafter appear or are incident to my invention, I attain by means of a construction illustrated in preferred form in the accompanying drawings, wherein—

Figure 11:
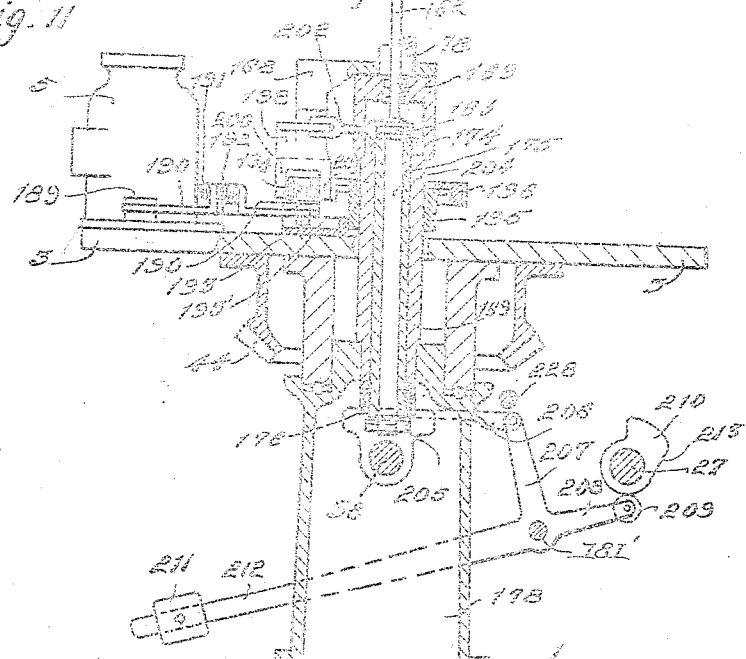

Figure 1 is a plan view showing the entire bottle making machine and a portion of the conveyer; Fig. 2 is a side elevation of the bottle making machine showing the glass segregating shears, the conveyer, the table arrangement and the driving shafts; Fig. 3 is a section through the driving shafts showing a face view of the intermittent table driving element; Fig. 4 is an end elevation of the blank mold table showing the machine base and operating shafts in section and the blank ejector, plunger cylinder, plunger, plunger valve, plunger valve operating mechanism, blow head controlling valve and the operating mechanism therefor; Figs. 5 and 6 are end and side elevations respectively of the adjustable plunger cylinder valve actuating cam; Fig. 7 is an end elevation of the blank mold table showing the machine base and operating shafts in section, and the blank transfer mechanism; Fig. 8 is an end elevation of the bottle mold table showing the operating shafts in section, the selector mechanism, the mold lock, the blow head cylinder and the bottle positioning or centering mechanism; Fig. 9 is an elevation of the selector at right angles to Fig. 8; Fig. 10 is a plan view of the bottle mold table showing the bottle molds and the apparatus for opening and closing the molds; Fig. 11 is a partial section of the bottle mold table on the line XI—XI of Fig. 10 and shows the mold operating mechanism above the table in elevation; Fig. 12 is an end elevation of the bottle mold table showing the bottle take out and transfer, certain portions being shown in section; Fig. 13 is an enlarged detail elevation of the bottle clamp which is part of the bottle transfer mechanism; and Fig. 14 is a diagrammatic showing of the piping and electric connections to the various operating elements embodied in the machine.

Referring to Figs. 1 and 2, the machine in general comprises a horizontal base 1 on which is mounted for rotation about a vertical axis, a blank mold table 2 and a bottle mold table 3. Upon the blank mold table 2 are mounted four blank molds 4, in which a blank for a bottle or other glass article is formed from a gathering of glass supplied to the blank mold either by hand or by some automatic mechanism. Upon the bottle mold table 3 are mounted five sectional bottle forming molds 5 which receive the blanks from the blank molds and in which the finished bottle or other glass article is formed.

In the process of manufacturing a finished bottle, a completed product by this machine, the glass is first gathered in some suitable manner from the melting tank, adjacent which the machine is located, and this glass "gathering" is then sheared from the gathering mechanism by a suitable shear above the blank mold. After the glass has been sheared and placed in the blank mold, the blank mold table is caused to rotate and carries the blank mold beneath a blank forming plunger. The plunger is caused to descend into the blank mold thus forming a blank from which a bottle will subsequently be formed. After the blank is formed the table again moves the blank mold into another operative position where a transfer mechanism grips the blank after it has been raised partly from the mold by an ejector, and transfers it to a bottle forming mold mounted upon the rotary bottle mold table adjacent the blank mold table. After the blank has been deposited in the bottle forming mold the bottle mold table is caused to rotate until the bottle mold is eventually registered with a blow head or mechanism for blowing the blank into the form of a bottle. If the blank is defective or what is called an "over press", a selector will be actuated which will prevent the operation of the blowing mechanism. After the table stops, with the bottle mold in operative position to be blown, a mold lock is actuated and finally the blow head descends and the blank is blown to form a bottle. After the bottle is formed the blow head is raised and the mold lock released. The bottle mold table is then rotated until the bottle mold containing the finished bottle is in operative position to be extracted from the mold and placed upon a conveyer. Before the mold is opened a bottle centering or positioning mechanism is actuated to retain the bottle in proper position to be picked up by the bottle "take out" or transfer. After the mold is opened the bottle is gripped by the transfer mechanism and transferred to an endless belt conveyer which receives the bottles prior to their removal to the leer.

The description of the various elements of the machine will follow in the order of their operation as above outlined, beginning with the mechanism for shearing the gathered glass into the blank mold. Referring to Figs. 1 and 2, the shear comprises a bracket 6 adjustably mounted upon the stationary central standard 7 about which the table 2 rotates. Pivoted by means of the bolt 6' to the bracket 6, are the shear blades 8 and 9, and secured to each blade are the bevel gear segments 10 and 11 respectively. Also journaled at 12 for rotation is the bevel gear wheel 13 which meshes with the gear segments 10 and 11 and which when oscillated causes the shear blades to move in opposite directions or to open and close. The engaging edges of the shear blades are provided with the usual cutting edges.

The bevel gear wheel 13 is oscillated about its axis by means of the crank arm 14 secured at one end to the gear shaft 15 and at the other end to a forked solenoid core 16 which is actuated longitudinally by the solenoid 17 secured to the standard 7. When the solenoid 17 is energized the core 16 is raised causing the bevel gear to be rotated in the proper direction to cause the shears to close and cut off a "gathering" of glass, and when the electric circuit through the solenoid 17 is broken the shears are opened by the action of the spring 18, Fig. 2, which is secured to the bracket 6 and pulls down the crank lever 14. The bracket 6 also supports the electric switch 19, and this switch is adapted to be actuated by the gathering mechanism (not shown) at such time as it is desired that the "gathering" should be sheared into the blank mold. The gathering mechanism may be operated either manually or automatically. To shear the "gathering" of glass the punty, in the case of a hand gathering implement, is brought in contact with the flexible switch handle 20, Figs. 1 and 14, causing the solenoid to be energized and to close the shears. As soon as the current is interrupted by the punty being disengaged from the switch arms 20, the shears are opened by the spring 18 and remain open until the solenoid is again energized.

After the "gathering" of glass has been deposited in the blank mold, into which the "gathering" falls from the shear, the tables are rotated clockwise until another blank mold is brought into operative charging position, and a bottle forming mold placed in a new operative position. Referring to Figs. 1, 2 and 3, the table rotating mechanism comprises a prime mover or motor 21 mounted upon the base 1, and provided with a driving pinion 22 which meshes with the spur gear 23, which in turn is mounted upon the shaft 24 and drives the pinion 25. The pinion 25 meshes with the spur gear 26, which is mounted on, and turns the main operating shaft 27. Shaft 27 is journaled in the bearings 28 and 29 mounted on the base 1 and carries the intermittent table driving element 30 as well as other actuating and controlling mechanism for the operative parts of the machine.

Referring to Figs. 1 and 3 the intermittent driving element 30 comprises a locking cam 32 mounted upon and keyed to the shaft 27 and incased on each side with the housing members 33 which carry the driving pin 34 securely fastened to the housings. The complementary unit 31 of the intermittent driving element 30 comprises a star wheel provided with slots 35. This star wheel is mounted upon the table drive shaft 36, which is parallel with the shaft 27, and is rotated anticlockwise by means of the pin 34 engaging a radial slot 35 in the star wheel when the housing members 33 are rotated clockwise. The star wheel is provided with concave edge surfaces 37 adapted to engage the convex face of the cam 32, the radius of the engaging curves being equal. The cam 32 is provided with a depressed surface 38 for a distance of one fourth of the periphery of the cam, for the purpose of permitting the projections 39 on the star wheel to pass the cam in the course of their revolution about the shaft 36, and to permit of the rotation of the star wheel when the pin enters the slot.

In the position shown in Fig. 3 and the parts moving in the direction of the arrow it will be seen that the pin 34 is about to turn the star wheel anticlockwise, and that the cam surface at the point 40 prevents any clockwise motion of the star wheel. The pin 34 will turn the star wheel one quarter revolution when it will leave the slot and after which motion the cam surface at 41 will then prevent any motion of the star wheel in either direction because of its close contact with the concave surface 37 of the star wheel. This construction of intermittent driving mechanism provides a drive wherein the shaft 36, which drives the blank mold table and the bottle mold table is rotated intermittently, is started to rotate at low velocity, acquires its highest velocity at the center of its limit of movement, is stopped gradually, and finally is locked against any rotation in either direction.

The shaft 36 rotates the blank mold table 2 by means of the miter gears 42 and 43, Figs. 1 and 2, secured to the shaft and the table respectively and causes the blank mold table to be rotated a quarter turn with the shaft 36, to every complete revolution of the main operating shaft 27. The bottle mold table is driven by the bevel gears 43' and 44 secured respectively to the shaft and the bottle mold table 3, and because of the different size of the bevel gears the bottle mold table is caused to rotate a one-fifth revolution to every complete revolution of the main operating shaft 27. Therefore every blank mold is moved one-fourth of a revolution about the table center to come into a new operative position, and every bottle mold is moved one-fifth of a revolution about the table center to come into a new operative position, the number of molds on each table corresponding to the fraction of revolution that the tables make at each movement.

The number of molds used on a table is determined by the speed at which the machine is to operate and may be varied for different wares and for different speeds of operation, such variation in the number of molds used being compensated for in the extent of rotation of the table to each revolution of the main operating shaft, by changing the size of the driving gears on the shaft 36 and tables 2 and 3.

After a "gathering" of glass has been deposited in the blank mold and the mold advanced to the next operative position by the driving mechanism just described, the gathering is ready to be pressed into the form of a blank. Referring to Figs. 1, 4, 5, 6 and 14, the pressing mechanism comprises a plunger 45 carried by any approved plunger head 46, Fig. 4, which is reciprocated by a fluid operated piston 47 operating in the cylinder 48 which is adjustably secured to the standards 7 and 49. The plunger 45 is caused to descend into the blank mold 4 to form a blank by means of fluid pressure supplied at the top of the cylinder 48 through the pipe 50, Fig. 14, the fluid exhausting at such time through the pipe 51 and exhaust pipe 54, the fluid passing through such pipes being controlled by the three way plug valve 52, Figs. 1, 4 and 14.

The valve 52 is operated by the valve lever 53 and when the lever is in the position shown in Fig. 4, the valve is supplying air through pipe 51, Fig. 14, to the bottom side of the piston and the plunger is being held in extreme upper position as shown in Fig. 4. At this time air is exhausting from the upper side of the piston through the pipe 50 and the exhaust 54. To cause the descent of the plunger 45 into the blank mold 4, the valve lever 53 must be pulled down at the proper interval or directly after the blank mold 4 has registered with the plunger. This operation is caused by the rotation of the main operating shaft 27 which carries the adjustable cam 55, Figs. 1, 4, 5 and 6, which cam engages the roller 56 carried by the lever 57 Figs. 1 and 4 pivoted to the shaft 57' pushing it down and thereby pulling down the valve lever 53 by means of the connecting rod 58 attached to the free end of the respective levers.

The cam 55, Figs. 5 and 6, is made in two parts having slots 59 cut therein through which a clamping bolt 59' is inserted, the bolt serving to hold the two parts of the cam in adjusted positions. One of the cam members carries a sleeve 60 which is keyed to the shaft 27 by means of the key 61. It will be seen that the cam surface of greatest radius may thus be shortened and lengthened, as the case demands, by increasing the length of the cam surface of greatest radius, the period of time which the valve lever 53 remains in lowermost position is increased accordingly, and the plunger 45 is caused thereby to remain in the blank mold an extended length of time.

The purpose of such adjustment of the interval of time that the plunger is permitted to remain in the mold, is to compensate for wares of different size and weight, the length of time the plunger should engage the glass blank depending upon its size and shape. The adjustable cam 55 provides a positive means for regulating and controlling the action of the plunger and a means that when once adjusted to a certain size blank, will not vary as will regulating means not having a positive action. As has been previously disclosed, the shaft 27 makes one complete revolution to every movement of the molds 4 and it is therefore possible to adjust the cam 55 in such position on the shaft that the valve 52 will be operated at the proper intervals to insure the required results. The valve lever 53 after being pulled down is returned to the position shown in Fig. 4 by means of the counter weight 62 adjustably mounted on the extended end of the lever 53.

After a blank has been pressed in the manner above described, and the plunger has been raised out of the blank mold, the table is again rotated a quarter revolution when the blank mold containing the finished blank is in its operative position for removal, such position being indicated at A, Figs. 1 and 4. To enable the ready removal of the blank by the transfer mechanism, it is first necessary to raise the blank out of the mold an inch or so, so that the blank transfer can grip it properly. Referring to Figs. 1 and 4, this apparatus comprises a movable blank mold bottom 63, Fig. 4 provided with a stem 64 having an enlarged end 65 protruding from the casing 66. This bottom is maintained in lower position by the spring 67 which presses the enlarged end of the stem 65 and holds it down.

After the blank mold has arrived at position A, a "kick up" or ejector lever 68 pivoted to the shaft 69, Figs. 1 and 4, is caused to engage the stem 65 and thereby push the bottom 63 upward carrying the blank 70 with it until the flange 71 on the blank is an inch or so above the top to the blank mold, where it may be gripped by the transfer mechanism. The ejector lever 68 is operated by the cam 72, Figs. 1 and 4, secured at the proper position on the main operating shaft 27, and in the position shown in Fig. 4, the cam is holding the lever 68 away from the pin 65. When the cam is rotated clockwise sufficient distance the pawl 73 formed on the lever 68 will fall abruptly down onto the low part of the cam, that is after the point 74 of the cam has passed the pawl 73. The counter weight 68' assists the dropping action of the pawl. When the pawl 73 drops the other end of the lever 68 will suddenly engage the pin 65 thus elevating the blank at the proper time. At the proper interval the pawl 73 will be raised and the lever 68 lowered to clear for the next operation.

At the time the blank is raised the blank transfer mechanism is in the positions illustrated in Figs. 1 and 7, and referring to such figures the blank transfer mechanism comprises a vertical shaft 75 mounted for vertical and rotary movement in the bearing 76 and the leg 77 of the spider frame which is supported by the vertical standard 78 at the center of the bottle mold table 3, and the vertical standards 79 and 80, Fig. 1. The vertical transfer shaft 75 is slidably keyed or feathered for longitudinal movement in the sleeve 81 journaled in the bearing 76, and is rotated by the sleeve.

The sleeve 81 is rotated by means of the lever 82, Figs. 1 and . secured to the lower end of the sleeve, and the lever is actuated by the link 83 connecting the lever 84 pivoted at 85 with the lever 82. The lever 84 is actuated by the bent link 86 secured to the other end of the lever 84 and to the bell-crank lever 87 pivoted to the shaft 57', Fig. 7. The horizontal arm of the bell-crank 87 carries a roller 88 which is held in engagement with the cam 89 secured to the operating shaft 27, by means of the counter weight 90 adjustably mounted on an extension 91, Fig. 7, of the bell crank lever. The cam 89 rotates in a clockwise direction and through the medium of the mechanism just described causes the shaft 75 to oscillate about its axis according to the motions imparted to the bell crank lever 87 by the cam 89

The shaft 75 is caused to reciprocate vertically by means of the lever 92 pivoted at one end to the shaft 69, Figs. 1 and 7, and which is provided with a forked end 93 which straddles the shaft 75 and engages the adjustable nut 94. The nut 94 is locked in place by the jam nut 95. The lever 92 is oscillated by the link 96 connecting the lever 92 with the rocking lever 97 which is pivoted to shaft 57', the lever 97 being provided with a roller 98 which engages the cam 99 secured to the main operating shaft 27.

When the cam 99 is rotated clockwise the vertical shaft 75 is reciprocated vertically according to the motion imparted by the engagement to the cam 99 with the roller 98 on the lever 97. The weight of the shaft and all parts carried by it, is counterbalanced by the counter weight 100 secured to a cable 101 which runs over the pulley 102 and is secured to the top end of the shaft 75.

The blank transfer mechanism for transferring a blank from a blank mold to a bottle mold situated on the bottle mold table 3, comprises a horizontal bracket 103, Figs. 1 and 7, mounted on the shaft 75, so that its minimum height is above the top of the blank and bottle molds. In the position shown in Figs. 7 and 1, the complete transfer is nearly midway of its vertical range of motion, and in a position about to move toward the blank to grip it. The blank gripping mechanism consists of a pair of clamps 104 and 105 having circular jaws adapted to grip a blank, the jaws being pivoted to the bracket 103 by means of a bolt 106. To the clamp 104 is secured the bevel gear segment 107 and to the clamp 105 is secured the bevel gear segment 108. The clamp jaws are operated by means of a bevel gear 109 which meshes with the segments 107 and 108 thereby causing the clamps to rotate about the pivot 106 in opposite directions when the bevel gear 109 is rotated, and to open and close when the bevel gear is oscillated about its axis.

The bevel gear 109 is oscillated by the shaft 110 to which it is secured, and the shaft 110 is mounted upon the bracket 103 by means of the two journals 111 and 112. The shaft is rotated in the direction necessary to cause the jaws 104 and 105 to open by means of the solenoid 113 carried by the shaft 75, the core 114 causing the lever 115, secured to the shaft 110, to be pulled down by the connecting link 116 when the solenoid is energized. The adjustable stop 117 secured to the shaft 110 limits the extent of opening of the jaws of the clamp by engaging the bracket 103 when the predetermined limit is reached.

The clamp members are closed when the solenoid is deënergized, by means of the tension spring 118 secured to the other end of the lever 115 and to the bracket 119 carried by the shaft 75.

The current passing through the solenoid 113 is controlled by means of the two cams 120 and 121, Figs. 14 and 1, mounted on the main operating shaft 27 which cams operate the flexible switch 122 secured to a block 123 mounted upon the machine base 1. When the cams 120 and 121 engage the switch 122, the contacts 124 and 125 are connected by means of the depression of the switch 122, thus completing the circuit from the main wires 126 and 127 through the branch wires 128 and 129. The cam 120 closes the circuit to open the clamps 104 and 105 in order to grip a blank and the cam 121 closes the circuit to open the clamp to release the blank when it has been transferred to the bottle mold.

The four cams, viz., cam 99 controlling the vertical lift of the shaft 75, cam 89 controlling the rotation of the shaft 75, cam 120 controlling the opening of the transfer clamp preparatory to gripping a blank, and cam 121 controlling the opening of the transfer clamp to release the blank, are so shaped and located on the main operating shaft 27 that they will actuate the transfer mechanism in the following manner starting with the position shown in Figs. 1 and 2. First the shaft 75 drops until the clamp jaws 104 and 105 just clear the top of the blank mold, the clamp jaws are opened by cam 120, the shaft is then rotated anticlockwise, (looking down on the top of the machine), by cam 89 until the clamp jaws register with the raised blank, the jaws close about the blank beneath the collar of the blank, cam 99 raises the shaft 75 until the bottom of the blank clears the top of the blank mold, cam 89 rotates the shaft 75 clockwise swinging the clamp around in a circular path until it registers directly above the opening in the bottle mold 5 at position B, cam 99 lowers shaft 75 until the clamp jaws just clear the top of the bottle mold, cam 121 causes the transfer clamp to open, dropping the blank into the bottle mold, cam 89 rotates shaft clockwise a short distance for the jaws to clear the collar of the blank, cam 121 permits the spring 118 to close the clamp jaws, cam 99 then raises the shaft 75 about half its vertical range, and the cam 89 finally rotates the shaft anti-clockwise swinging the clamp to the starting position shown in Figs. 1 and 7.

As the clamps are held open by energization of the solenoid 113, they are allowed to remain open only sufficient time to clear the blank to grip it and release it in order to economize on the electric current consumption.

After a blank has been deposited in a blank mold at position B, Fig. 1, the mold table is rotated clockwise by mechanism previously described, carrying the blank to position C. Here the blank remains while it is allowed to cool sufficiently before being conducted to the "blowing up" station D by the next movement of the table. For this purpose five molds are used on the bottle mold table when four are used on the blank mold table. When the bottle mold containing the blank arrives at the position D, Figs. 1 and 8, the blank is registered with the "blow head" 130, Figs. 8 and 14, which is of any approved type, operated by a piston 131 operating in the fluid cylinder 132, and adapted to descend upon the blank to blow it into the form of a bottle. The blow head is supplied with compressed air through the flexible hose connection 133, Fig. 14, which receives air from the main supply pipe 134, and by means of a valve mechanism of common type carried by the blow head air is permitted to blow into the hollow blank when the head engages the top of the bottle mold Fluid pressure is supplied to the top and bottom faces of the piston in the cylinder 132 by means of the tubes 135 and 136, Fig. 14, and such fluid pressure is controlled by the valve 137, Figs. 1 and 14, to which the tubes 135 and 136 are indirectly connected. Before the "blow head" 130 is permitted to descend to blow up the blank, the mold must be securely locked and for this purpose a locking cylinder 138, Figs. 1, 8 and 14, is provided, which operates a forked lock 139 adapted to engage lugs 140 and 141, Fig. 8, integral with each mold section (the lugs being tapered and one of the prongs of the lock being correspondingly tapered), to provide a wedging action in order to press the lugs together securely. The lock 139 is carried by the piston 142 which is reciprocated vertically within the cylinder 138, such motion being caused by compressed fluid operating on the top and bottom faces of the piston and supplied to such piston faces within the cylinders by means of the tubes 143 and 144 directly connected to the three way plug valve 137 which controls the fluid supply to the cylinder 138.

The mold locking cylinder 138 and the "blow up" cylinder 132 are mounted upon the leg 145, Figs. 1 and 8, of the spider frame which is supported by the standards 78, 79, and 80, and are both supplied with fluid pressure from the main supply pipe 134, controlled by the valve 137. The pipes 143 and 144, Fig. 14, leading from the valve 137 to the lock cylinder 138, are of greater capacity and of shorter length than the tubes 135 and 136 leading to the "blow up" cylinder from the valve 137, and for this reason, the lock 139 will be actuated in advance of the blow head, which is the effect desired.

The valve 137 is actuated by the lever 146, Figs. 1, 4 and 14, carrying a counter weight 147 on one end and at the other connected to the operating lever 148 pivoted to the shaft 57' by means of the connection rod 149. The lever 148 carries a roller 150 which engages the cam 151 secured to the main operating shaft 27 and is held in engagement therewith by the action of the counter weight 147.

In the position of the valve lever 146 shown in Fig. 4, the "blow head" and mold lock are maintained in raised position, shown in Fig. 8, by air flowing through the tubes 144 and 146 Fig. 14 to the bottom faces of the pistons, the air on the upper faces of the pistons having been exhausted through the tubes 135 and 143 and through the exhaust pipe 152.

The cam 151 is so adjusted upon the main operating shaft 27 that the mold lock and the blow head are caused to descend immediately after the table has moved a bottle mold into proper position.

Should too much glass be supplied to the blank mold, what is called an "over press" is the result which is a blank having too much glass at the top and which will project slightly above the bottle mold when the blank is inserted therein. If the blow head is permitted to descend upon an "over press," it will shatter the glass and the pieces will fall into the mold and, aside from preventing proper working of the mold, time is lost in cleaning the mold so that it may be properly closed. To prevent the blow head from descending upon an "over press," a selector mechanism is provided which comprises a selector rod 153, Figs. 1, 8 and 9, having a flat widened lower end 154 Fig. 8 pivoted at its upper end to a bracket 155 secured to the top of the "blow up" cylinder 132. The flattened end of the selector rod lies in the path of the blank so that it just clears the top of the mold but is engaged by an "over press." Pivoted to the selector rod 153, is the notched latch bar 156 Figs. 8 and 9 provided near its free end with a notch 157. The free end of the latch bar 156 is supported upon a bracket 158 and when an "over press" engages the lower end 154 of the selector rod 153, moving in the direction toward the left, Fig. 9, the latch bar will be moved to the left and the free end will drop and be latched into position beneath the annular flange 159 on the upper end of the piston rod extending above the "blow up" cylinder 132, which carries the blow head.

When the blow head 130 is caused to descend by the operation of the valve 137, the annular flange 159 will engage the top of the end of the latch bar 156 and further descent of the blow head will be prevented, such slight movement of the blow head not being sufficient to cause it to engage the "over press" or defective blank. In order to raise the latch bar so that the selector rod may gravitate to its normal position shown in Fig. 9, a horizontal lifting rod 160 is provided. This rod is supported at one end upon the "blow up" cylinder 132, so that it may slide between the bracket 155 and the bracket 158, Fig. 9 and carries at the end adjacent the latch bar 156 a flat leaf spring 161, Figs. 8 and 9. The other end of the horizontal lifting bar 160 is pivoted to a vertical standard 162, Figs. 8, 9 and 11, secured to a lever 163, Figs. 1 and 11. The lever 163 oscillates with a shaft 204 centrally located within the central part of the bottle mold table, and serves to operate the mold opening and closing mechanism, a complete description of which will hereinafter appear. When the lever 163 operates to close a mold it moves the horizontal lifting rod 160 longitudinally toward the latch bar, and the spring 161 thereupon engages the under side of the end of the latch bar, lifting it up so that the bracket 158 clears the notch and permits the selector bar to assume its normal position ready to operate when another over press is carried beneath it.

After a blank has been blown into the form of a bottle and the blow head 130 and the mold lock 139 have been raised, the table is again rotated clockwise until the blown bottle is located at point E, Figs. 1 and 10 where it is permitted to cool while another bottle is being blown. The table is then advanced again until the bottle is brought to the position F where it will be taken from the mold after the mold is opened. While the mold is being opened, however, the bottle must be held stationary so that it will be in proper position to be extracted from the mold by the bottle transfer to be hereinafter described.

Referring to Figs. 1 and 8, the bottle centering or holding mechanism comprises a centering lever 164 provided at its free end with a semi-spherical bottle engaging lug 165 adapted to fit into the neck of a bottle when the lever 164 is in its lower position. The lever 164 is secured at one end to the rock shaft 166 Figs. 1 and 8 journaled in the bearing block 167 which is mounted upon the bracket 168 secured to the central standard or shaft housing 169. To the other end of the rock shaft 166 is secured a rocking lever 170' in the free end of which is socketed a link 171 by means of a ball joint 172, the other end of the link having a ball and socket connection with the vertical standard 173 carried on and actuated by the oscillating lever 174, Figs. 1, 8 and 11. The lever 174 is oscillated by the vertical rocking sleeve 175 supported within the shaft housing 169, Fig. 11. To the lower end of the rocking sleeve 175 is secured the rocking lever 176, Figs. 1, 8 and 11, which projects through an opening 177 in the bottle mold table pedestal 178. The rocking lever 176 is oscillated by the link 179 which connects it pivotally with the bell crank lever 180, Figs. 1 and 8, the bell crank lever being oscillated by means of the cam 181 secured to the main operating shaft 27 and which engages the roller 182 carried by the arm 183 of the bell crank lever. The roller 182 is maintained in contact with the cam 181 by means of the counter weight 184, Fig. 8, adjustably mounted on the bell crank lever extension 185.

When the cam 181 turns clockwise so that the roller 182 rides the depression in the cam the link 179 is pushed to the left, Fig. 8, thereby causing the link 171 to move to the left which action moves the centering lever 164 downward until the lug 165 engages the inside of the neck of the bottle. The cam 181 is so located on the main operating shaft 27 that the centering lever 164 is actuated to center the bottle immediately after the mold table stops rotating. The instant the bottle is engaged by the centering mechanism just described, the bottle mold is caused to open by mechanism to be hereinafter described, and after the mold is completely open the cam 181 causes the centering lever 164 to be raised again to the position shown in Fig. 8.

Referring to Figs. 1, 10 and 11, the bottle mold and opening and closing mechanisms comprise a pair of mold sections 186 and 187 which constitute the mold, generally referred to, and designated by the numeral 5. These sections are hinged on the side near the center of the table by means of pins 188. Each section is provided with a lug 189 projecting from the side of the mold, which is pivoted to a toggle link 190 made in two sections and connected by a bolt 191 with a compression spring 192 interposed between them. The ends of the toggle link not engaged with the mold lugs are pivoted together by means of the pin 193 and above the joint thus formed is mounted for rotation about the said pin 193, a roller 194.

To the central stationary shaft housing 169, Fig. 11, is secured a collar 195 upon which is secured a stationary cam 196 of sufficient diameter that the rollers 194 will be snugly engaged when the molds are closed, thus preventing displacement of the mold sections while the molds are being revolved about the cam. The toggle links are made in sections with the springs 192 interposed to prevent injury to the mechanism should particles of glass or other foreign articles prevent the proper closing of the mold. Should a piece of foreign substance prevent the mold from closing, the toggle link will shorten by compressing the spring and no injury will result.

A notch 197 is provided in the cam 196 adjacent the position F assumed by the mold when the bottle is to be taken out, for the purpose of permitting the roller 164 to be drawn toward the center of the table until it assumes the position shown in dotted lines at G, at which time the mold sections will be moved to the positions shown in dotted lines at H., Fig. 10.

The mechanism for opening and closing the molds comprises a forked oscillating lever 198, Figs. 1, 10 and 11, pivoted to the bracket 168 by means of the pin 199. This forked lever 198, is provided with two downwardly projecting prongs 200 and 201, Fig. 11, between which the roller 194 on the toggle links stop when a mold is in position to be opened. The other end of the forked lever is pivoted to a link 202 which serves to oscillate the forked lever, and when the link 202 is moved to the left, Fig. 11, it causes the forked end of the lever 198 to move toward the center of the table to the position shown in broken lines and carry the roller with it until the roller assumes position G, Fig. 10. This action opens the mold.

The lower end of the toggle pin 193 is guided radially in a line extending from the center of the table 3, by means of a guide 193' secured to the table adjacent the collar 195. This guide insures equal motion of the mold sections, the hinge of which is alined with the guide The link 202 is pivoted to the oscillating lever 163 which is secured to the vertical rock shaft 204 mounted within the vertical rock sleeve 175, Fig. 11. To the lower end of the rock shaft 204 is secured the oscillating lever 205 which is connected to the operating link 206 pivoted to the bell-crank lever 207, Figs. 1 and 11. The bell-crank lever 207 is pivoted to the shaft 181' and upon the arm 208 of the bell-crank lever is mounted a roller 209 which engages the cam 210 secured to the main operating shaft 27. The roller 209 is maintained in engagement with the cam 210 by means of the counter weight 211 adjustably mounted upon the bell-crank lever extension 212, Fig. 11

The cam 210 is positioned upon the main operating shaft 27 so that the molds are caused to open immediately after the bottle centering lever 164, Fig. 8, previously referred to, engages a bottle. In the position of parts shown in Figs. 1, 10 and 11, the molds are closed and the roller 209 is riding the depressed face of the cam 210. The mold is opened when the roller rides up the incline 213 on the cam 210, and is held open while the roller rides the face of maximum radius. After the bottle has been removed by the bottle transfer, next to be described, the mold is closed before the table is again started, and remains closed until it again arrives at position F.

Referring to Figs. 1, 12, 13 and 14 the mechanism for removing a finished bottle from the mold and placing it upon an endless conveyer belt, comprises a vertical operating shaft 214, Figs. 1 and 12, journaled for vertical and rotary movement in the bearings carried by the spider leg 215 and in the bearing 216 mounted upon the base 1. The lower end of the shaft 214 is longitudinally slidably keyed or feathered in the sleeve 217 mounted for rotation in the bearing 216, and is rotated by the sleeve 217. The bottle transfer mechanism is practically the same as the mechanism used for transferring the blank from the blank mold to the bottle mold, which was previously described in detail. The vertical shaft 214 is oscillated about its axis by means of the oscillating lever 218, Figs. 1 and 12, secured to the sleeve 217, and which is connected to the link 219 which connects the lever 218 with another lever 220 pivoted at 221. The other end of the lever 220 is pivoted to the reciprocating link 222 which is pivoted to the bell-crank lever 223 which is in turn pivoted on the shaft 181'. The arm 224 of the bell-crank lever carries a roller 225 which engages the cam 226 secured to the shaft 27. The roller 225 is maintained in engagement with the cam 226 by means of the counter weight 223' adjustably secured to the bell-crank lever extension 223''. The cam 226 is rotated in a clockwise direction and causes the vertical shaft 214, through the described media to oscillate about its axis according to the motion imparted to the bell-crank lever 223 by the cam 226.

The vertical shaft 214 is caused to reciprocate longitudinally by means of the oscillating lever 227 pivoted to the shaft 228. The free end of the lever 227 is forked at 229 and straddles the shaft 214 and engages an adjustable nut 230. The lever 227 is oscillated by the connecting link 231 which connects the lever 227 with the rocking lever 232. The free end of the rocking lever 232 carries a roller 233 which engages a cam 234 secured to the main operating shaft 27. The weight of the shaft 214 and all parts carried by it is counter balanced by the weight 235, Fig. 12, secured to the cable 236 which runs over a pulley 237 and is connected to the upper end of the shaft 214. The shaft 214 is reciprocated longitudinally according to the motion imparted to the rocking lever 232 by means of the cam 234, which rotates in a clockwise direction The bottle gripping and transfer mechanism is mounted upon the vertical operating shaft 214 and in the position shown in Figs. 1 and 12, the mechanism is about to be dropped preparatory to swinging in toward the bottle to grip it after the mold opens.

The mechanism comprises a bracket 238, Figs. 1 and 12 secured to the shaft 214, and which carries a pair of circular clamp jaws 239, and 240, adapted to grip a bottle beneath the collar. Each clamp jaw 239 and 240, Figs. 1, 12 and 13, is pivoted to the bracket 238, by the bolt 241, and carries a bevel gear segment 242 and 243 respectively, Fig. 13, a bevel gear wheel 244, Figs. 12 and 13, meshes with the segments 242 and 243, and when rotated about its axis, causes the gear segments with their attached clamp to rotate in the opposite direction, and when the bevel gear wheel 244 is oscillated it causes the clamp jaws to open and close with respect to each other. The bevel gear shaft 245 is journaled in the bearings 246 and 247, and the shaft is oscillated by the lever 248 secured to the free end of the shaft, and which is raised to open the bottle clamp, by means of the solenoid 249, connected to the lever 248 by the rod 250 pivoted to the solenoid 251. The solenoid 249 is mounted upon the vertical shaft 214 and moves with it. The range of action of the solenoid core is limited by the adjustable bolt 252 screwed in the top of the solenoid.

A limit bar 253 is adjustably secured to the shaft 245 and limits the movement of the shaft so that the clamp may not be opened too wide. The clamp is closed by means of the tension spring 254 attached at one end of the lever 248 and at the other end to a bracket 255 secured to the vertical shaft 214.

The solenoid 249 is controlled by an electric switch 256, Figs. 1 and 14, operated by two cams 257 and 258 secured to the main operating shaft 27. The cam 257 depresses the flexible switch bar 256, which is mounted upon the block 256', Fig. 14, and connects the contacts 259 and 260 thereby actuating the solenoid 249 to open the clamp to grip a bottle, and the cam 258 also acts on the switch bar 256 to energize the solenoid to open the clamp to release a bottle after it has been transferred to the conveyer, to be hereinafter described.

The four cams 226, 234, 257, and 258 which control and actuate the bottle transfer mechanism are positioned upon the main operating shaft 27 in such manner that they will cause the transfer mechanism to perform in the following manner, starting with the parts in the position shown in Figs. 1 and 15. First the cam 234 causes the shaft 214 to drop carrying with it the transfer clamp, until the clamp is slightly below the top of the mold, then the cam 257 causes the clamp jaws 239 and 240 to open, cam 226 then causes the bracket 238 to swing toward the mold, until the center of the clamp jaws registers with the center of a bottle, cam 257 then breaks the circuit through the solenoid and the spring 254 then closes the clamp about the neck of the bottle. The cam 225 next raises the clamp about an inch by raising the vertical shaft 214, and then cam 226 causes the shaft to rotate anti-clockwise until the clamp is directly over the conveyer 261, Figs. 1 and 2. The cam 234 then causes the clamp to lower about an inch to deposit the bottle on the conveyer belt, the cam 258 then actuates the switch 256 causing the clamp to open to release the bottle, after which the cam 226 again swings the clamp anti-clockwise to clear the bottle, then the cam 258 breaks the circuit through the solenoid 249 again permitting the spring 254 to close the clamp. The cam 234 next raises the closed clamp to the elevation shown in Fig. 12 and the cam 226 finally swings the clamp to the starting position shown in Fig. 1.

Referring to Figs. 1 and 2, the conveyer for receiving bottles from the bottle mold comprises an endless belt 261 mounted upon two sprockets 262 and 263, the belt being made up of flat plates 264 carried upon the endless chain 265, each plate being of a size sufficient to hold a bottle. At the top of the conveyer belt, the plates are supported upon the guides 266. The conveyer is driven by means of a belt or chain 267 carried on the sprocket 268 secured to the table turning shaft 36, and the sprocket 269 mounted upon the shaft 270. The shaft 270 turns a miter gear 271 which drives the shaft 272, to which the sprocket 263 is keyed, by means of the miter gear 273.

As the shaft 36 which drives the tables is operated intermittently it follows that the conveyer chain will be moved intermittently toward the right, and each time a bottle mold is moved to a new position. Thus an empty conveyer plate 264 is at the point I where a bottle is to be deposited, after each movement of the mold table. The bottles may be carried to the leer by such a conveyer or may be conducted there manually by leer boys who gather up four or five bottles at a time from the endless conveyer by a suitable tool.

Referring to Fig. 14, which is a diagrammatic showing of the various air and electrical connections with the operative elements of the machine it will be seen how the switch 256 operates the solenoid 249 which actuates the bottle clamp on the bottle take out and transfer. When the contact points 259 and 260 are closed the circuit through the solenoid 249 is closed and the current passes from the positive wire 126 through wire 274 through the solenoid coil and to the negative return wire 127 through the wire 275.

The motor 21 is supplied with current from the feed wires 126 and 127 by means of the branch wires 276 and 277, current to the feed wires being controlled by the knife switch 278, pneumatic switch 279 and the controller 280.

The solenoid 17 which operates the shears receives current from the main circuit wires 126 and 127 and is controlled as before stated by the switch 19.

The three air operated cylinders 48, 132 and 138 all receive compressed air from the main supply pipe 134 which air supply is controlled by the valve 281. When the valve 281 is closed and the electric switch 278 is open the machine is standing still and if air leaks out of the plunger cylinder and the mold lock cylinder, the plunger is liable to be down in a blank mold and the mold lock in engagement with a bottle mold. Should the switch 278 be closed without first opening the valve 281, and the motor should start the machine before the plunger and the mold lock were raised, the machine would be cor iderably damaged. To prevent such an o..urrence, the pneumatically controlled switch 279, Fig. 14, is employed which consists of a contact 278ª carried upon a piston stem 282 which is secured to a piston 283 in the cylinder 284 which is supplied with air from the pipe 134 at a point beyond the valve 181. The switch 278 is normally held open by the spring 285 engaging the piston and the end of the cylinder and closed by air from the pipe 134. Therefore the air must be first turned on to close the switch 279 before it will be possible to start the electric motor 21.

The complete operation of the machine is as follows:—The machine is first started by opening the air supply valve 181 and then by closing the knife switch 278 and afterward cutting the resistance out of the controller 280. After the machine is brought to full operation, a gathering of glass on a punty or other mechanism is deposited in the blank mold and the punty shoved against the yielding switch arm 20 causing the shear to close and sever the glass. The table is then rotated clockwise a quarter turn after which the blank mold with the "gathering" therein is pressed into the form of the blank. After the plunger clears the mold the blank mold table is again rotated a quarter turn bringing the blank mold containing the blank into position for removal.

The blank is then raised out about an inch by the "kick-up" mechanism after which operation the blank transfer grips the blank, lifts it out of the blank mold, swings it over to a bottle mold and lowers the blank therein, releasing the blank after depositing it.

After the bottle mold has received the blank it is moved by two separate successive movements to the position where the blank is to be blown into the form of a bottle.

The mold lock now descends and locks the mold and immediately afterward the blow head descends and blows the blank into the form of a bottle. After this operation the mold containing the bottle is moved by two successive movements of the table to the position where the bottle is to be removed.

At this point the bottle centering lever descends and holds the bottle while the mold is being opened and as soon as the mold has been opened the centering lever releases its hold on the bottle and the bottle is gripped by the bottle transfer. The bottle transfer grips the bottle, swings it clear of the mold and deposits it upon the conveyer where it is conveyed to the leer or lifted therefrom by leer-boys.

It will be observed that all the operative elements of the machine are driven by or controlled by a single operating shaft 27 which is continuously driven by the motor 21, and therefore as each operative element is independent of all other elements of the machine and operated and controlled by a motor shaft, all parts must move with precision and there is little danger of parts becoming out of order. Furthermore the failure of one operative element does not involve other elements.

What I claim is:

1. In a bottle making machine having a blank forming mold and a bottle forming mold, the combination of a blank transfer mechanism comprising a shaft mounted for longitudinal and rotary motion, means for actuating the shaft, a blank clamp carried by the said shaft adapted to grip a blank in the blank mold, and electromagnetic means for operating the clamp controlled by the shaft actuating means.

2. In a bottle making machine transfer mechanism for transferring a blank from a blank mold to a bottle forming mold, the combination of a shaft, a swinging arm secured thereto, blank clamp members pivoted to the arm, a rotary shaft carried upon the swinging arm for operating the clamp members, and means whereby the clamp members are swung toward and away from one another when the rotary shaft is oscillated.

3. In a bottle making machine transfer mechanism for transferring a blank from a blank mold to a bottle forming mold, the combination of an oscillating shaft, an arm secured thereto, blank clamp members pivoted to the arm, a gear segment on each clamp member, a gear wheel meshed with each segment, and electromagnetic means for oscillating the gear wheel about its axis to open and close the clamp.

4. In combination in a bottle making machine, a blank forming mold, a bottle forming mold, means for moving the molds to operative position, means for forming a blank in a blank mold, means, including a clamp carried on a swinging arm, for transferring the blank from the blank mold to the bottle forming mold, electromagnetic means for operating the clamp, and means controlling the clamp actuating means actuated by the mold moving means.

5. In combination in a bottle making machine using a blank, a bottle forming mold, means for placing the blank in the mold, means for blowing the blank to form a bottle, and means operated by a defective blank whereby the blank blowing means is prevented from actuation.

6. In combination in a bottle making machine using a blank, a bottle forming mold, means for placing the blank in the mold, a blow head adapted to engage the blank to form a bottle, and means actuated by the blank for preventing the engagement of the blow head with the blank.

7. In combination in a bottle making machine, having molds containing blanks adapted to be blown to form bottles, a blow head, means for registering the molds with the blow head, means for moving the blow head into engagement with the blank actuated after a mold is registered with the blow head, and means for preventing the engagement of the blow head with the blank actuated by the mold registering means.

8. In a bottle making machine, a sectional bottle forming mold, a blow head for blowing a bottle, a mold lock for locking the mold sections together, fluid operated means for actuating the blow head and the mold lock controlled by a single valve, an inlet passage between the valve and the blow head actuating means, and an inlet passage of greater capacity than the first inlet passage between the valve and the mold lock actuating means whereby the mold lock actuating means is operated before the blow head actuating means is operated when the controlling valve permits fluid to enter the passages.

9. In a bottle making machine having a bottle forming mold, the combination of a bottle extracting mechanism, comprising a shaft mounted for longitudinal and rotary motion, a bottle clamp carried by the said shaft adapted to grip a bottle in the mold, and electro-magnetic means for operating the clamp.

10. In a bottle making machine transfer mechanism for transferring a bottle from a mold to a conveyer, the combination of a shaft, an arm secured thereto, bottle clamp members pivoted to the arm, a gear segment on each clamp member, a gear wheel meshed with each segment, and means for oscillating the gear wheel about its axis to open and close the clamp.

11. In combination in a bottle making machine, a bottle forming mold, means for making a bottle in the mold, means for moving the mold to operative position, a bottle conveyer, means, including a clamp for transferring the bottle from the mold to the conveyer, electro-magnetic means for operating the clamp and controlling means therefor operated by the mold moving means.

12. In combination in a bottle making machine having pneumatically operated elements controlled by an electrically operated element, a current supply means for the electrically operated element, a switch controlling such current supply means, a fluid supply for operating the pneumatically operated elements, and means for operating the switch actuated by the fluid supply.

13. In combination in a bottle making machine, a blank mold, a fluid operated plunger adapted to be moved into the mold to form a blank, a valve for controlling the operation of the plunger adapted when in one position to cause the plunger to be moved into the mold and when in a second position, to cause the plunger to be moved out of the mold, and a cam adapted to be continuously rotated at a constant speed adapted to actuate the valve and provided with a cam surface portion for holding the valve in the first position during part of a revolution of the cam, the said surface portion being adjustable so that the time the valve is held in the first position may be varied.

In testimony whereof I have hereunto signed my name in the presence of the two subscribed witnesses.

RICHARD O. STILWELL. [L. S.]

Witnesses:
HOWARD E. ROBINSON,
WILLIAM HENRY, Jr.